United States Patent
Duong

(10) Patent No.: US 8,272,922 B2
(45) Date of Patent: Sep. 25, 2012

(54) METHOD OF POLISHING A SUBSTRATE

(75) Inventor: Chau H. Duong, Newark, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 981 days.

(21) Appl. No.: 12/055,621

(22) Filed: Apr. 23, 2008

(65) Prior Publication Data

US 2008/0188163 A1 Aug. 7, 2008

Related U.S. Application Data

(62) Division of application No. 11/504,415, filed on Aug. 14, 2006, now abandoned.

(60) Provisional application No. 60/718,489, filed on Sep. 19, 2005.

(51) Int. Cl.
*B24B 1/00* (2006.01)

(52) U.S. Cl. ............................................. 451/41; 451/36

(58) Field of Classification Search .................. 451/41, 451/526, 527, 533, 535; 51/298, 297, 307–309
See application file for complete search history.

(56) References Cited

U.S. PATENT DOCUMENTS

| | | | |
|---|---|---|---|
| 3,862,074 A | 1/1975 | Hickey | |
| 4,943,604 A | 7/1990 | Okuri et al. | |
| 5,215,828 A | 6/1993 | Brindoepke et al. | |
| 5,783,303 A * | 7/1998 | Tsuei | 428/354 |
| 6,007,407 A | 12/1999 | Rutherford et al. | |
| 6,354,915 B1 | 3/2002 | James et al. | |
| 6,379,794 B1 | 4/2002 | Girgis | |
| 6,918,821 B2 | 7/2005 | Balijepalli et al. | |
| 2002/0025763 A1 * | 2/2002 | Lee et al. | 451/41 |
| 2002/0049033 A1 | 4/2002 | Newell | |
| 2002/0098782 A1 * | 7/2002 | James et al. | 451/41 |
| 2002/0098784 A1 * | 7/2002 | Chadda et al. | 451/59 |
| 2003/0036339 A1 * | 2/2003 | Bonner et al. | 451/41 |
| 2003/0055171 A1 * | 3/2003 | Overbeek et al. | 525/192 |
| 2003/0064671 A1 * | 4/2003 | Pasqualoni et al. | 451/308 |
| 2003/0068960 A1 * | 4/2003 | Reinhardt et al. | 451/41 |
| 2003/0153255 A1 | 8/2003 | Hasegawa et al. | |
| 2005/0032468 A1 | 2/2005 | Hunt et al. | |
| 2006/0058472 A1 | 3/2006 | Anzures et al. | |
| 2006/0202384 A1 | 9/2006 | Duong et al. | |
| 2008/0063856 A1 | 3/2008 | Duong et al. | |

OTHER PUBLICATIONS

Bechara et al., "Witcobond(R) A-100, A Solvent-Free Polyurethane/Polyacrylate Alloy", 2003 Crompton Corporation, Rev. 11/03-500.

* cited by examiner

*Primary Examiner* — Robert Scruggs
(74) *Attorney, Agent, or Firm* — Thomas S. Deibert

(57) ABSTRACT

A method for polishing a substrate using a pad comprising, a polymeric matrix having microspheres dispersed therein, the polymeric matrix being formed of a water-based polymer or blends thereof, wherein the polymeric matrix is applied on a permeable substrate, and wherein the polishing pad exhibits reduced defectivity and improved polishing performance are provided.

6 Claims, 4 Drawing Sheets

METHOD OF POLISHING A SUBSTRATE

CROSS REFERENCE TO RELATED APPLICATION

This is a divisional application of U.S. application Ser. No. 11/504,415, filed Aug. 14, 2006 now abandoned, which claims the claims the benefit of U.S. Provisional Application Ser. No. 60/718,489 filed Sep. 19, 2005.

BACKGROUND OF THE INVENTION

The present invention relates to methods of using polishing pads for chemical mechanical planarization (CMP), and in particular, relates to methods of using water-based polishing pads exhibiting improved defectivity.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes nonplanar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer carrier is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other fluid medium is flowed onto the polishing pad and into the gap between the wafer and the polishing pad. Thus, the wafer surface is polished and made planar by the chemical and mechanical action of the slurry and pad surface.

Casting polymers (e.g., polyurethane) into cakes and cutting ("skiving") the cakes into several thin polishing pads has proven to be an effective method for manufacturing "hard" polishing pads with consistent reproducible polishing properties. Unfortunately, polyurethane pads produced from the casting and skiving method can have polishing variations arising from a polishing pad's casting location. For example, pads cut from a bottom casting location and a top casting can have different densities and porosities. Furthermore, polishing pads cut from molds of excessive size can have center-to-edge variations in density and porosity within a pad. These variations can adversely affect polishing for the most demanding applications, such as low k patterned wafers.

Also, coagulating polymers utilizing a solvent/non-solvent process to form polishing pads in a web format has proven to be an effective method of manufacturing "soft" polishing pads. This method (i.e., web-format) obviates some of the drawbacks discussed above that is found in the casting and skiving process. Unfortunately, the (organic) solvent that is typically used (e.g., N,N-dimethyl formamide) may be cumbersome and cost prohibitive to handle. In addition, these soft pads may suffer from pad-to-pad variations due to the random placement and structure of the porosities that are formed during the coagulation process.

In addition, polishing pads may be formed by combining two or more pads together. For example, Rutherford et al., in U.S. Pat. No. 6,007,407, discloses polishing pads for performing CMP that are formed by laminating two layers of different materials. The upper polishing layer is attached to a lower layer or "sub-pad" formed from a material suitable for supporting the polishing layer. The sub-pad typically has higher compressibility and lower stiffness than the polishing layer and essentially acts as supporting "cushions" for the polishing layer. Conventionally, the two layers are bonded with a pressure-sensitive adhesive ("PSA"). However, PSAs have relatively low bonding strength and marginal chemical resistance. Consequently, a laminated polishing pad utilizing PSAs tend to cause the sub-pad to separate ("delaminate") from the upper polishing layer, or vice versa, during polishing, rendering the pad useless and impeding the polishing process.

Thus, there is a demand for a polishing pad with improved density and porosity uniformity. In particular, what is needed is a polishing pad that provides consistent polishing performance, lower defectivity, which resists delamination and is cost effective to manufacture.

STATEMENT OF THE INVENTION

In a first aspect of the present invention, there is provided a chemical mechanical polishing pad comprising, a polymeric matrix having microspheres dispersed therein, the polymeric matrix being formed of a water-based polymer or blends thereof, and wherein the polymeric matrix is applied on a permeable substrate.

In a second aspect of the present invention, there is provided a chemical mechanical polishing pad comprising, a polymeric matrix having porosity or filler dispersed therein, the polymeric matrix being formed of a blend of a urethane and acrylic dispersion at a ratio by weight percent of 100:1 to 1:100, and wherein the polymeric matrix is applied on a permeable substrate.

In a third aspect of the present invention, there is provided a method of manufacturing a chemical mechanical polishing pad, comprising: supplying a water-based fluid phase polymer composition containing microspheres onto a continuous transported permeable substrate; shaping the polymer composition on the transported permeable substrate into a fluid phase polishing layer having a predetermined thickness; curing the polymer composition on the transported permeable substrate in a curing oven to convert the polymer composition to a solid phase polishing layer of the polishing pad.

DETAILED DESCRIPTION OF THE INVENTION

The present invention provides a water-based polishing pad with reduced defectivity and improved polishing performance. Preferably, the polishing pad is manufactured in a web-format and reduces the pad-to-pad variations often associated with cast and skived "hard" polishing pads. In addition, the polishing pad is preferably water-based rather than organic-solvent based, and easier to manufacture than prior art "soft" pads formed by a coagulation process. Also, the polishing pad is directly applied to a permeable substrate, eliminating the use of adhesives, and decreasing cost and delamination of the polishing pad. The polishing pad of the present invention is useful for polishing semiconductor substrates, rigid memory disks, optical products and for use in polishing various aspects of semiconductor processing, for example, ILD, STI, tungsten, copper, low-k dielectrics and ultra low-k dielectrics.

Figure 1:
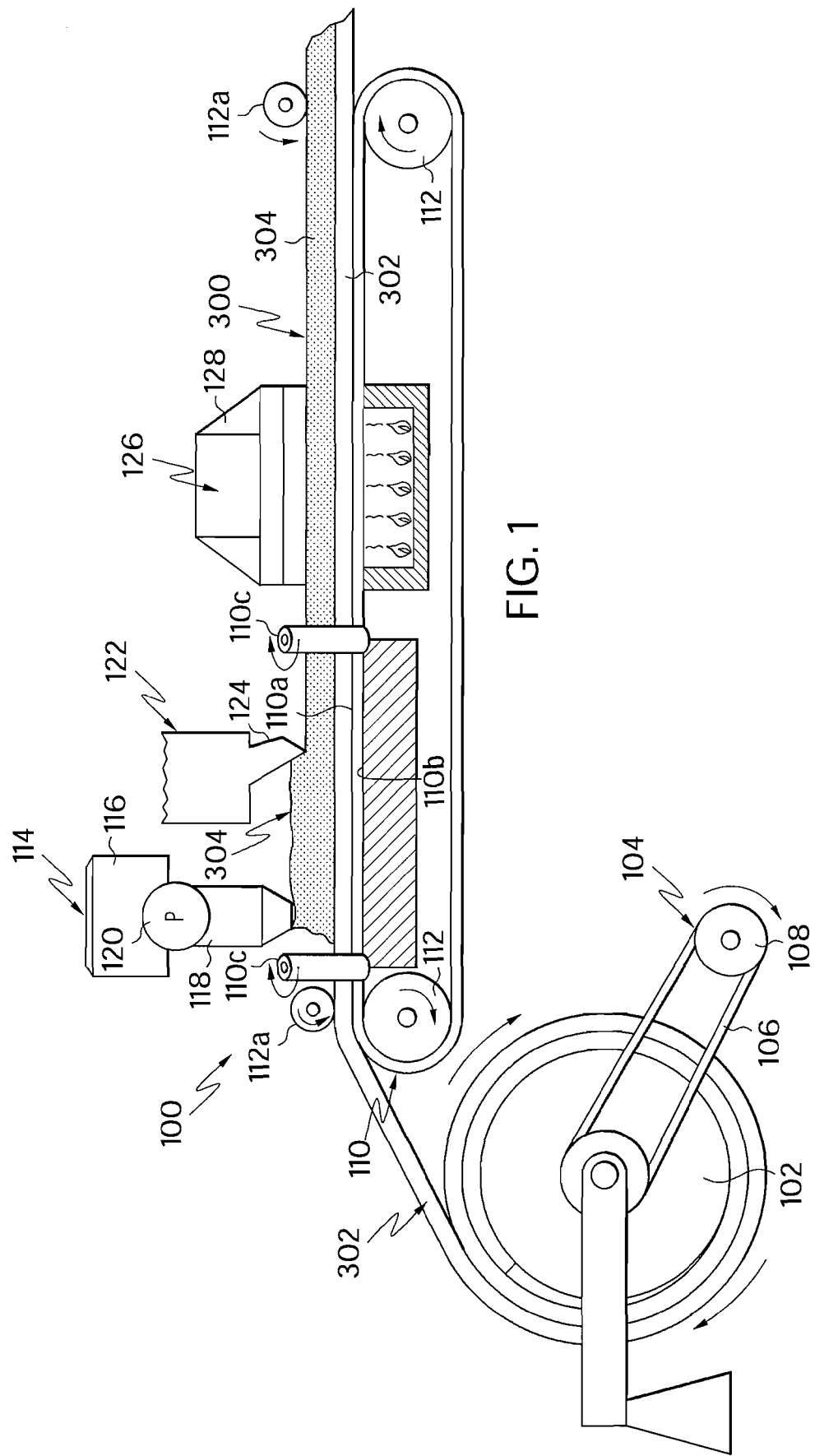
FIG. 1 illustrates an apparatus for continuous manufacturing of the water-based polishing pad of the present invention.

Referring now to the drawings, FIG. 1 discloses an apparatus 100 for manufacturing a water-based polishing pad 300 of the present invention. Preferably, the water-based polishing pad 300 is formed in a "rolled" format that allows "continuous manufacturing" to reduce variations among different polishing pads 300 that may be caused by batch processing. The apparatus 100 includes a feed reel or an unwind station 102 that stores a helically-wrapped permeable substrate 302 in lengthwise continuous form. The substrate 302 is formed of any permeable membrane, such as, a woven or non-woven web, for example, spun-bonded web or needle-punched web (e.g., Suba IV™ from Rohm and Haas Electronic Materials CMP Inc., of Newark, Del.). In the present invention, the substrate 302 preferable becomes an integral part of the final product. Any material, including, polyester, nylon and other fibers, including blends thereof, can be used to form the permeable substrate 302. As discussed below, at least some of the viscous, fluid state polymer composition penetrates and binds to the permeable membrane of the substrate 302, which allows improved chemical and mechanical adhesion properties over conventional adhesive techniques.

The substrate 302 preferably has a thickness between 2 mils to 100 mils (0.051 mm to 2.54 mm). More preferably, the substrate 302 preferably has a thickness between 10 mils to 60 mils (0.254 mm to 1.52 mm). Most preferably, the substrate 302 preferably has a thickness between 20 mils to 30 mils (0.508 mm to 0.762 mm).

The feed roller 102 is mechanically driven to rotate at a controlled speed by a drive mechanism 104. The drive mechanism 104 includes, for example, a belt 106 and motor drive pulley 108. Optionally, the drive mechanism 104 includes, a motor driven flexible shaft or a motor driven gear train (not shown).

Referring still to FIG. 1, the continuous substrate 302 is supplied by the feed reel 102 onto a continuous conveyor 110, for example, a stainless steel belt, that is looped over spaced apart drive rollers 112. The drive rollers 112 may be motor driven at a speed that synchronizes linear travel of the conveyor 110 with that of the continuous substrate 302. The substrate 302 is transported by the conveyor 110 along a space between each drive roller 112 and a corresponding idler roller 112a. The idler roller 112a engages the conveyor 110 for positive tracking control of the substrate 302. The conveyor 110 has a flat section 110a supported on a flat and level surface of a table support 110b, which supports the substrate 302 and transports the substrate 302 through successive manufacturing stations 114, 122 and 126. Support members 110c in the form of rollers are distributed along the lateral edges of the conveyor 110 and the substrate 302 for positive tracking control of the conveyor 110 and the substrate 302.

The first manufacturing station 114 further including a storage tank 116 and a nozzle 118 at an outlet of the tank 116. A viscous, fluid state polymer composition is supplied to the tank 116, and is dispensed by the nozzle 118 onto the continuous permeable substrate 302. The flow rate of the nozzle 118 is controlled by a pump 120 at the outlet of the tank 116. The nozzle 118 may be as wide as the width of the continuous permeable substrate 302 to cover the entirety of substrate 302. As the conveyor 110 transports the continuous permeable substrate 302 past the manufacturing station 114, a continuous-fluid phase polishing layer 304 is supplied onto the substrate 302. In this way, at least some of the viscous, fluid state polymer composition penetrates and binds to the permeable membrane of the substrate 302, which allows improved chemical and mechanical adhesion properties over conventional adhesive techniques (i.e., adhering a top pad to a sub-pad utilizing a pressure-sensitive adhesive).

Because the raw materials can be mixed in a large homogeneous supply that repeatedly fills the tank 116, variations in composition and properties of the finished product are reduced. In other words, the present invention provides a web-format method of manufacturing a water-based polishing pad to overcome the problems with prior art cast and skive techniques. The continuous nature of the process enables precise control for manufacturing a water-based polishing pad 300 from, which large numbers of individual polishing pads 300 are cut to a desired area pattern and size. The large numbers of individual polishing pads 300 have reduced variations in composition and properties.

Preferably, the fluid state polymer composition is water-based. For example, the composition may comprise a water-based urethane dispersion (e.g., W-290H, W-293, W-320, W-612 and A-100 from Crompton Corp. of Middlebury, Conn. and HP-1035 and HP-5035 from Cytec Industries Inc. of West Paterson, N.J.) and acrylic dispersion (e.g., Rhoplex® E-358 from Rohm and Haas Co. of Philadelphia, Pa.). In addition, blends, such as, acrylic/styrene dispersions (e.g., Rhoplex® B-959 and E-693 from Rohm and Haas Co. of Philadelphia, Pa.) may be utilized. In addition, blends of the water-based urethane and acrylic dispersions may be utilized.

In a preferred embodiment of the invention, a blend of the water-based urethane and acrylic dispersion is provided at a ratio by weight percent of 100:1 to 1:100. More preferably, a blend of the water-based urethane and acrylic dispersion is provided at a ratio by weight percent of 10:1 to 1:10. Most preferably, a blend of the water-based urethane and acrylic dispersion is provided at a ratio by weight percent of 3:1 to 1:3.

The water-based polymer is effective for forming porous and filled polishing pads. For purposes of this specification, filler for polishing pads include solid particles that dislodge or dissolve during polishing, and liquid-filled particles or spheres. For purposes of this specification, porosity includes gas-filled particles, gas-filled spheres and voids formed from other means, such as mechanically frothing gas into a viscous system, injecting gas into the polyurethane melt, introducing gas in situ using a chemical reaction with gaseous product, or decreasing pressure to cause dissolved gas to form bubbles.

Optionally, the fluid state polymer composition may contain other additives, including, a defoamer (e.g., Foamaster®

111 from Cognis) and reology modifiers (e.g., Acrysol® ASE-60, Acrysol I-62, Acrysol RM-12W, Acrysol RM-825 and Acrysol RM-8W all from Rohm and Haas Company. Other additives, for example, an anti-skinning agent (e.g., Borchi-Nox® C3 and Borchi-Nox M2 from Lanxess Corp.) and a coalescent agent (e.g., Texanol® Ester alcohol from Eastman Chemicals) may be utilized.

A second manufacturing station 122 includes, for example, a doctor blade 124 located at a predetermined distance from the continuous substrate 302 defining a clearance space therebetween. As the conveyor 110 transports the continuous substrate 302 and the fluid phase polishing layer 304 past the doctor blade 124 of the manufacturing station 122, the doctor blade 124 continuously shapes the fluid phase polishing layer 304 to a predetermined thickness.

A third manufacturing station 126 includes a curing oven 128, for example, a heated tunnel that transports the continuous substrate 302 and the polishing layer 304. The oven 128 cures the fluid phase polishing layer 304 to a continuous, solid phase polishing layer 304 that adheres to the continuous substrate 302. The water should be removed slowly to avoid, for example, surface blisters. The cure time is controlled by temperature and the speed of transport through the oven 128. The oven 128 may be fuel fired or electrically fired, using either radiant heating or forced convection heating, or both.

Preferably, the temperature of the oven 128 may be between 50° C. to 150° C. More preferably, the temperature of the oven 128 may be between 55° C. to 130° C. Most preferably, the temperature of the oven 128 may be between 60° C. to 120° C. In addition, the polishing layer 304 may be moved through the oven 128 at a speed of 5 fpm to 20 fpm (1.52 mps to 6.10 mps). Preferably, the polishing layer 304 may be moved through the oven 128 at a speed of 5.5 fpm to 15 fpm (1.68 mps to 4.57 mps). More preferably, the polishing layer 304 may be moved through the oven 128 at a speed of 6 fpm to 12 fpm (1.83 mps to 3.66 mps).

Figure 1A:
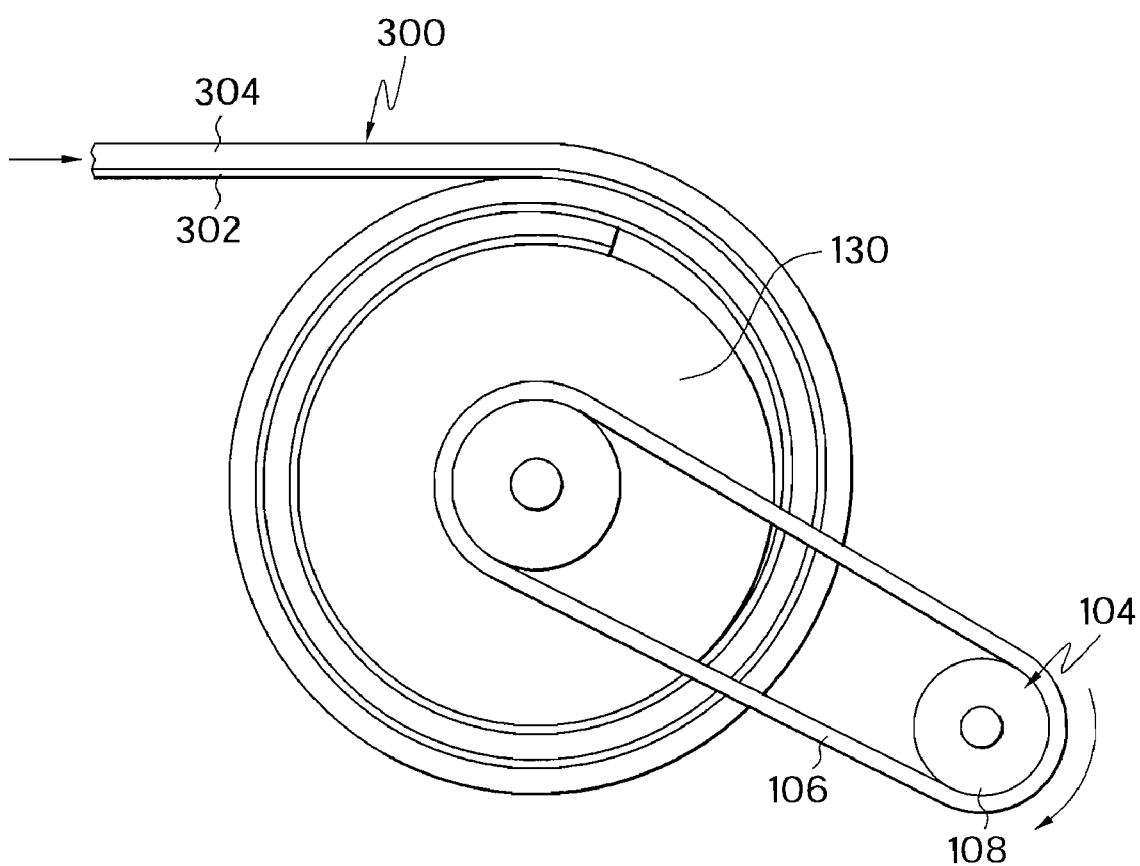
FIG. 1A illustrates another manufacturing apparatus of the present invention.

Referring now to FIG. 1A, upon exiting the oven 128, the continuous substrate 302 is adhered to a continuous, solid phase polishing layer 304 to comprise, a continuous, water-based polishing pad 300. The water-based polishing pad 300 is rolled helically onto a take up reel 130, which successively follows the manufacturing station 126. The take up reel 130 is driven by a second drive mechanism 104. The take up reel 130 and second drive mechanism 104 comprise, a separate manufacturing station that is selectively positioned in the manufacturing apparatus 100.

Figure 2:
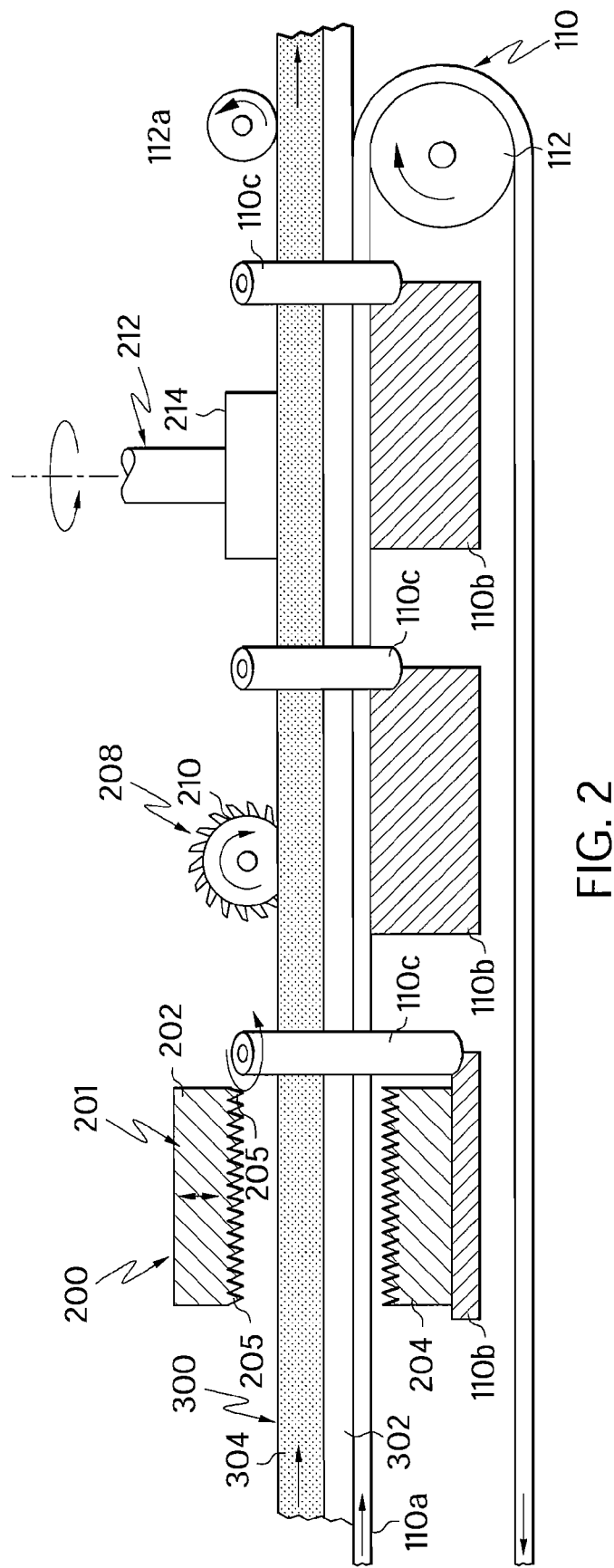
FIG. 2 illustrates an apparatus for continuous conditioning of the water-based polishing pad of the present invention.

Referring now to FIG. 2, an apparatus 200 for surface conditioning or surface finishing of the continuous, water-based polishing pad 300 is optionally provided. The apparatus 200 includes either a similar conveyor 110 as that disclosed by FIG. 1, or a lengthened section of the same conveyor 110. The conveyor 110 of apparatus 200 has a drive roller 112, and a flat section 110a supporting the water-based polishing pad 300 that has exited the oven 126. The conveyor 110 of apparatus 200 transports the continuous polishing pad 300 through one or more manufacturing stations 201, 208 and 212, where the water-based polishing pad 300 is further processed subsequent to curing in the oven 126. The apparatus 200 is disclosed with additional flat table supports 110b and additional support members 110c, which operate as disclosed with reference to FIG. 1.

The solidified polishing layer 304 may be buffed to expose a desired surface finish and planar surface level of the polishing layer 304. Asperities in the form of grooves or other indentations, are worked into the surface of the polishing layer 304, as desired. For example, a work station 201 includes a pair of compression forming, stamping dies having a reciprocating stamping die 202 and a fixed die 204 that close toward each other during a stamping operation. The reciprocating die 202 faces toward the surface of the continuous polishing layer 304. Multiple teeth 205 on the die 202 penetrate the surface of the continuous polishing layer 304. The stamping operation provides a surface finishing operation. For example, the teeth 205 indents a pattern of grooves in the surface of the polishing layer 304. The conveyor 110 may be intermittently paused, and becomes stationary when the dies 202 and 204 close toward each other. Alternatively, the dies 202 and 204 move in synchronization with the conveyor 110 in the direction of transport during the time when the dies 202 and 204 close toward each other.

Manufacturing station 208 includes, for example, a rotary saw 210 for cutting grooves in the surface of the continuous polishing layer 304. The saw 210 is moved by, for example, a orthogonal motion plotter along a predetermined path to cut the grooves in a desired pattern of grooves. Another manufacturing station 212 includes a rotating milling head 214 for buffing or milling the surface of the continuous polishing layer 304 to a flat, planar surface with a desired surface finish that is selectively roughened or smoothed.

The sequence of the manufacturing stations 202, 210 and 212 can vary from the sequence as disclosed by FIG. 2. One or more of the manufacturing stations 202, 210 and 212 can be eliminated as desired. The take up reel 130 and second drive mechanism 104 comprise, a separate manufacturing station that is selectively positioned in the manufacturing apparatus 200 at the end of the conveyor 110 to gather the solid phase continuous polishing pad 300.

Figure 3:
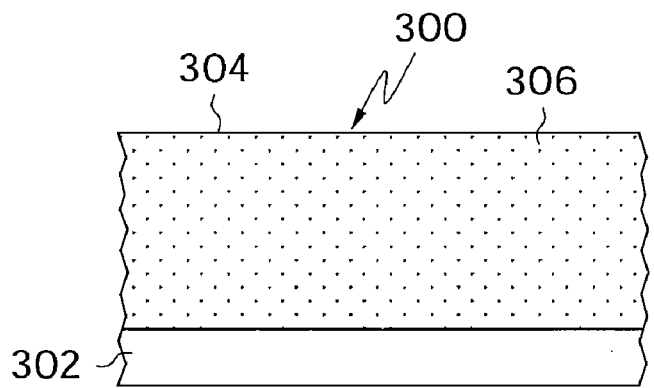
FIG. 3 illustrates a cross section of the water-based polishing pad manufactured according to the apparatus disclosed by FIG. 1.

Referring now to FIG. 3, a sectional view of the polishing pad 300 manufactured by the apparatus 100 of the present invention is provided. As discussed above, upon curing in the oven 128, the water-based polymer forms a solidified, continuous polishing pad 300. Optionally, the polishing pad 300 may comprise abrasive particles or particulates 306 in the polishing layer 304 to form a fixed-abrasive pad. Accordingly, the abrasive particles or particulates 306 are included as a constituent in the fluid state polymer mixture. The polymer mixture becomes a matrix that is entrained with the abrasive particles or particulates 306.

Figure 3A:
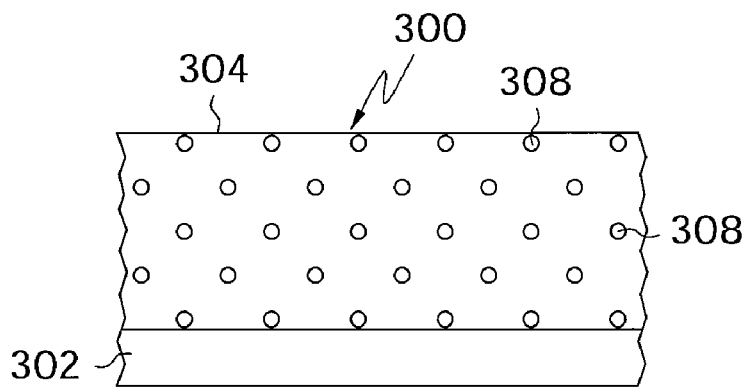
FIG. 3A illustrates another water-based polishing pad manufactured according to the apparatus disclosed by FIG. 1.

Referring now to FIG. 3A, in another embodiment of the polishing pad 300 of the present invention, an entrained constituent in the form of, a foaming agent or blowing agent or a gas, is included in the polymer mixture, which serves as a matrix that is entrained with the constituent. Upon curing, the foaming agent or blowing agent or gas escapes as volatiles to provide the open pores 308 distributed throughout the continuous polishing layer 304. Polishing pad 300 of FIG. 3A further comprises the substrate 302.

Figure 3B:
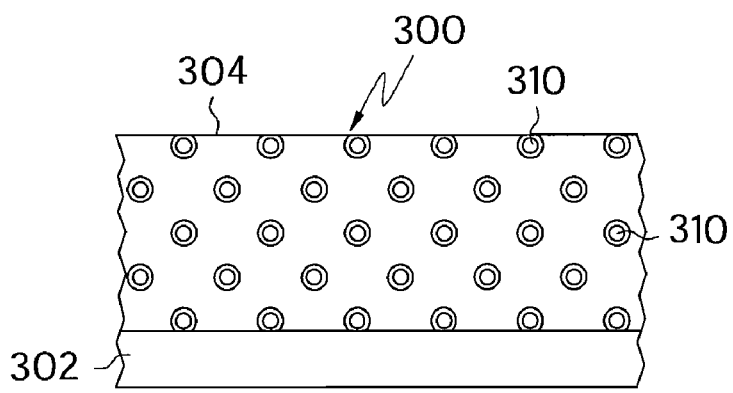
FIG. 3B illustrates another water-based polishing pad manufactured according to the apparatus disclosed by FIG. 1.

Referring now to FIG. 3B, another embodiment of the polishing pad 300 is disclosed, comprising microballons or polymeric microspheres 310 included in the polymer mixture, and distributed throughout the continuous polishing layer 304. The microspheres 310 may be gas filled. Alternatively the microspheres 310 are filled with a polishing fluid that is dispensed when the microspheres 310 are opened by abrasion when the polishing pad 300 is used during a polishing operation. Alternatively, the microspheres 310 are water soluble polymeric microelements that are dissolved in water during a polishing operation. Polishing pad 300 of FIG. 3B further comprises the substrate 302.

Preferably, at least a portion of the microspheres 310 are generally flexible. Suitable microspheres 310 include inorganic salts, sugars and water-soluble particles. Examples of such polymeric microspheres 310 (or microelements) include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin and combinations thereof. The microspheres 310 may be chemically modified to change the solubility, swelling and other properties by branching, blocking, and crosslinking, for example. A preferred material for the microsphere is a copolymer of polyacrylonitrile and polyvinylidene chloride (e.g., Expancel™ from Akzo Nobel of Sundsvall, Sweden).

Preferably, the water-based polishing pads 300 may contain a porosity or filler concentration of at least 0.3 volume percent. This porosity or filler contributes to the polishing pad's ability to transfer polishing fluids during polishing. More preferably, the polishing pad has a porosity or filler concentration of 0.55 to 70 volume percent. Most preferably, the polishing pad has a porosity or filler concentration of 0.6 to 60 volume percent. Preferably the pores or filler particles have a weight average diameter of 10 to 100 μm. Most preferably, the pores or filler particles have a weight average diameter of 15 to 90 μm. The nominal range of expanded hollow-polymeric microspheres' weight average diameters is 15 to 50 μm.

Accordingly, the present invention provides a water-based polishing pad with reduced defectivity and improved polishing performance. Preferably, the polishing pad is manufactured in a web-format and reduces the pad-to-pad variations often associated with cast and skived "hard" polishing pads. In addition, the polishing pad is preferably water-based rather than organic-solvent based, and has a greater yield and less defects than prior art "soft" pads formed by a coagulation process. Also, at least some of the viscous, fluid state polymer composition penetrates and binds to the permeable membrane of the substrate, which allows improved chemical and mechanical adhesion properties over conventional adhesive techniques.

EXAMPLES

The following Table illustrates the improved defectivity of the water-based pad of the present invention. The water-based pad was formed by mixing 75 grams of W-290H urethane dispersion from Crompton Corp. with 25 grams of Rhoplex® E-358 acrylic dispersion from Rohm and Haas Company in a 3 to 1 ratio for 2 minutes in a mix tank. Then, 1 gram of Foamaster® 111 defoamer from Cognis was added to the mix tank and mixed for another 2 minutes. Then 0.923 grams of Expancel® 551 DE40d42 (Expancel® 551DE40d42 is a 30-50 μm weight average diameter hollow-polymeric microsphere manufactured by Akzo Nobel) was added to the mix tank and mixed for another 5 minutes. Also, 1 gram of a thickener, Acrysol® ASE-60 and 5 Acrysol I-62, both from Rohm and Haas Company was added to the mix tank and mix for 15 minutes. Then, the mixture was coated (50 mils (1.27 mm) thick wet) on a Suba IV™ permeable substrate and dried in a hot air oven at 60° C. for 4 hrs. The resulting polishing pad was 25 mils (0.64 mm) thick. The water-based polishing pad was then provided with a circular groove having a pitch of 120 mils (3.05 mm), depth of 9 mils (0.23 mm) and width of 20 mils (0.51 mm). An Applied Materials Mirra® polishing machine using the water-based polishing pad of the present invention, under downforce conditions of 1.5 psi (10.34 kPa) and a polishing solution flow rate of 150 cc/min, a platen speed of 120 RPM and a carrier speed of 114 RPM planarized the samples (copper sheet wafers). As shown in the following Tables, Tests 1 to 3 represent samples polished with the polishing pads of the present invention and Tests A1 to B2 represent comparative examples of samples polished with a prior art pads. Namely, Test A was run with Politex® polishing pads and Test B was run with IC1100® polishing pads.

TABLE 1

| Test | Scratch[1] | Basic[2] | New Basic[3] |
|------|----------|--------|------------|
| 1 | 32 | 162 | 289 |
| 2 | 21 | 105 | 184 |
| A1 | 142 | 482 | 2989 |
| A2 | 116 | 511 | 3103 |
| B1 | 8136 | 26408 | 25181 |
| B2 | 7885 | 25912 | 24948 |

[1]A spherical mark on surface approximately 1-10 μm in size
[2]The Scratch defect counts plus, a consecutive series of pits or gouges arranged in a line approximately greater than 10 μm in length.
[3]Includes every type of defect on a wafer.

As shown in Table 1 above, the water-based pad of the present invention provided the least amount of defectivity in the samples polished. For example, the samples polished with the water-based pad of the present invention provided a greater than 10 fold decrease in defectivity as compared to the samples polished with the prior art pads.

Accordingly, the present invention provides a water-based polishing pad with reduced defectivity and improved polishing performance. Preferably, the polishing pad is manufactured in a web-format and reduces the pad-to-pad variations often associated with cast and skived "hard" polishing pads. In addition, the polishing pad is preferably water-based rather than organic-solvent based, and has a greater yield and less defects than prior art "soft" pads formed by a coagulation process. Also, the polishing pad is directly applied to a permeable substrate, eliminating the use of adhesives, thereby decreasing cost and exposure to delamination of the polishing pad.

What is claimed is:

1. A chemical mechanical planarization method comprising:
   providing a chemical mechanical polishing machine;
   providing a semiconductor substrate;
   providing a polishing solution;
   providing a chemical mechanical polishing pad comprising,
      a permeable substrate having a thickness of 2-100 mils; and
      a polishing layer comprising a polymeric matrix having microspheres dispersed therein, wherein the polymeric matrix is formed of a water-based polymer blend, wherein the polishing layer is applied on the permeable substrate, wherein the polymeric matrix comprises a blend of 3:1 to 1:3 (by weight) of an aqueous urethane dispersion and an acrylic dispersion, wherein the microspheres are gas filled, wherein the polymeric matrix contains at least 0.3 volume percent microspheres, wherein the microspheres have a weight average diameter of 10-100 μm, wherein the polishing layer has grooves formed therein;
   mounting the chemical mechanical polishing pad in the chemical mechanical polishing machine;
   mounting the semiconductor substrate in the chemical mechanical polishing machine;
   dispensing the polishing solution onto the chemical mechanical polishing pad and into a gap between the semiconductor wafer and the chemical mechanical polishing pad; and, creating dynamic contact between the chemical mechanical polishing pad and the semiconductor wafer, wherein a surface of the semiconductor substrate is polished and made planar; and, wherein the chemical mechanical polishing pad exhibits improved defectivity.

2. The method of claim 1, wherein the polymeric matrix penetrates and binds to the permeable substrate.

3. The method of claim 1, wherein the permeable substrate is a woven or a non-woven web.

4. The method of claim 1, wherein the polymeric matrix comprises a blend of 3:1 (by weight) of an aqueous urethane dispersion and an acrylic dispersion.

5. A chemical mechanical planarization method comprising:

providing a chemical mechanical polishing machine;
providing a copper sheet wafer;
providing a polishing solution;
providing a chemical mechanical polishing pad comprising,
   a permeable substrate having a thickness of 2-100 mils; and
   a polishing layer comprising a polymeric matrix having microspheres dispersed therein, wherein the polymeric matrix is formed of a water-based polymer blend, wherein the polishing layer is applied on the permeable substrate, wherein the polymeric matrix comprises a blend of 3:1 to 1:3 (by weight) of an aqueous urethane dispersion and an acrylic dispersion, wherein the microspheres are gas filled, wherein the polymeric matrix contains at least 0.3 volume percent microspheres, wherein the microspheres have a weight average diameter of 10-100 μm, wherein the polishing layer has grooves formed therein;

mounting the chemical mechanical polishing pad in the chemical mechanical polishing machine;

mounting the copper sheet wafer in the chemical mechanical polishing machine;

dispensing the polishing solution onto the chemical mechanical polishing pad and into a gap between the copper sheet wafer and the chemical mechanical polishing pad; and, creating dynamic contact between the chemical mechanical polishing pad and the copper sheet wafer, wherein a surface of the copper sheet wafer is polished and made planar; and, wherein the chemical mechanical polishing pad exhibits improved defectivity, where the chemical mechanical polishing pad creates less than 300 total defects on the surface of the copper sheet wafer when the chemical mechanical polishing pad is used to polish the copper sheet wafer on the chemical mechanical polishing machine, under downforce conditions of 1.5 psi, a polishing solution flow rate of 150 cc/min, a platen speed of 120 RPM and a carrier speed of 114 RPM.

6. The method of claim 5, wherein the wherein the polymeric matrix comprises a blend of 3:1 (by weight) of an aqueous urethane dispersion and an acrylic dispersion.

* * * * *